(12) United States Patent
Yokoyama

(10) Patent No.: US 12,175,697 B2
(45) Date of Patent: Dec. 24, 2024

(54) INFORMATION PROCESSING APPARATUS AND INFORMATION PROCESSING METHOD

(71) Applicant: SONY GROUP CORPORATION, Tokyo (JP)

(72) Inventor: Masayuki Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 359 days.

(21) Appl. No.: 17/440,235

(22) PCT Filed: Mar. 16, 2020

(86) PCT No.: PCT/JP2020/011449
§ 371 (c)(1),
(2) Date: Sep. 17, 2021

(87) PCT Pub. No.: WO2020/196028
PCT Pub. Date: Oct. 1, 2020

(65) Prior Publication Data
US 2022/0156960 A1 May 19, 2022

(30) Foreign Application Priority Data
Mar. 28, 2019 (JP) .................................. 2019-063440

(51) Int. Cl.
*G06T 7/70* (2017.01)
*G06T 11/00* (2006.01)
(Continued)

(52) U.S. Cl.
CPC ................ *G06T 7/70* (2017.01); *G06T 11/00* (2013.01); *G06V 10/751* (2022.01); *H04N 5/33* (2013.01);
(Continued)

(58) Field of Classification Search
CPC .... G06T 7/80; G06T 7/73; G06T 7/74; G06T 7/70; G06T 11/00; G06T 2207/10048;
(Continued)

(56) References Cited

U.S. PATENT DOCUMENTS 11,216,083 B2 * 1/2022 Hiroi .................... G02B 6/0031
2012/0194517 A1 8/2012 Izadi et al.
(Continued)

FOREIGN PATENT DOCUMENTS

AR 084931 A1 7/2013
CN 102681661 A 9/2012
(Continued)

OTHER PUBLICATIONS

International Search Report and Written Opinion of PCT Application No. PCT/JP2020/011449, issued on Jun. 16, 2020, 09 pages of ISRWO.
(Continued)

*Primary Examiner* — Vu Le
*Assistant Examiner* — Jack Peter Kraynak
(74) *Attorney, Agent, or Firm* — CHIP LAW GROUP

(57) ABSTRACT

The present technology relates to an information processing apparatus and an information processing method that enable an operation to be performed using a wearable device that is less resistant to being worn all the times. The information processing apparatus according to one aspect of the present technology acquires a captured image obtained by capturing an image of a wearable device including a module whose appearance changes according to time, detects a module included in the captured image on the basis of an image representing an appearance of the module according to a current time, and estimates at least one of a position or a posture of the wearable device. The present technology can be applied to, for example, a transmissive HMD.

16 Claims, 20 Drawing Sheets

(51) Int. Cl.
*G06V 10/75* (2022.01)
*H04N 5/33* (2023.01)
*H04N 13/332* (2018.01)

(52) U.S. Cl.
CPC . *H04N 13/332* (2018.05); *G06T 2207/10048* (2013.01)

(58) Field of Classification Search
CPC .... G06V 10/70; G06V 10/751; H04N 13/332; H04N 5/33
See application file for complete search history.

(56) References Cited

U.S. PATENT DOCUMENTS

| | | | |
|---|---|---|---|
| 2014/0285520 A1* | 9/2014 | Park | G06T 19/006 345/633 |
| 2015/0063661 A1 | 3/2015 | Lee | |
| 2015/0193104 A1 | 7/2015 | Cho | |
| 2016/0178906 A1* | 6/2016 | Rider | G06F 3/00 726/17 |
| 2018/0217663 A1* | 8/2018 | Chandrasekhar | G06F 3/0346 |
| 2018/0348846 A1* | 12/2018 | Lee | G06F 1/3218 |
| 2019/0227497 A1* | 7/2019 | Matsuoh | G04C 10/02 |
| 2019/0295323 A1* | 9/2019 | Gutierrez | G02B 27/017 |
| 2020/0379411 A1* | 12/2020 | Watanabe | H04M 1/72412 |

FOREIGN PATENT DOCUMENTS

| | | | |
|---|---|---|---|
| CN | 104427372 | A | 3/2015 |
| CN | 104793735 | A | 7/2015 |
| CN | 107077548 | A | 8/2017 |
| CN | 107977247 | A | 5/2018 |
| CN | 109241892 | A | 1/2019 |
| EP | 2670496 | A2 | 12/2013 |
| EP | 2980741 | A1 | 2/2016 |
| EP | 3234739 | A1 | 10/2017 |
| HK | 1174113 | A1 | 5/2013 |
| JP | 2000-098300 | A | 4/2000 |
| JP | 2014-513822 | A | 6/2014 |
| JP | 2016-066187 | A | 4/2016 |
| JP | 2016057191 | A * | 4/2016 |
| JP | 2018-506767 | A | 3/2018 |
| KR | 10-2014-0008510 | A | 1/2014 |
| KR | 10-2017-0095199 | A | 8/2017 |
| TW | 201234261 | A | 8/2012 |
| WO | 2012/106070 | A2 | 8/2012 |
| WO | 2016/099752 | A1 | 6/2016 |

OTHER PUBLICATIONS

Extended European Search Report of EP Application No. 20779035.3, issued on Apr. 11, 2022, 08 pages.

* cited by examiner

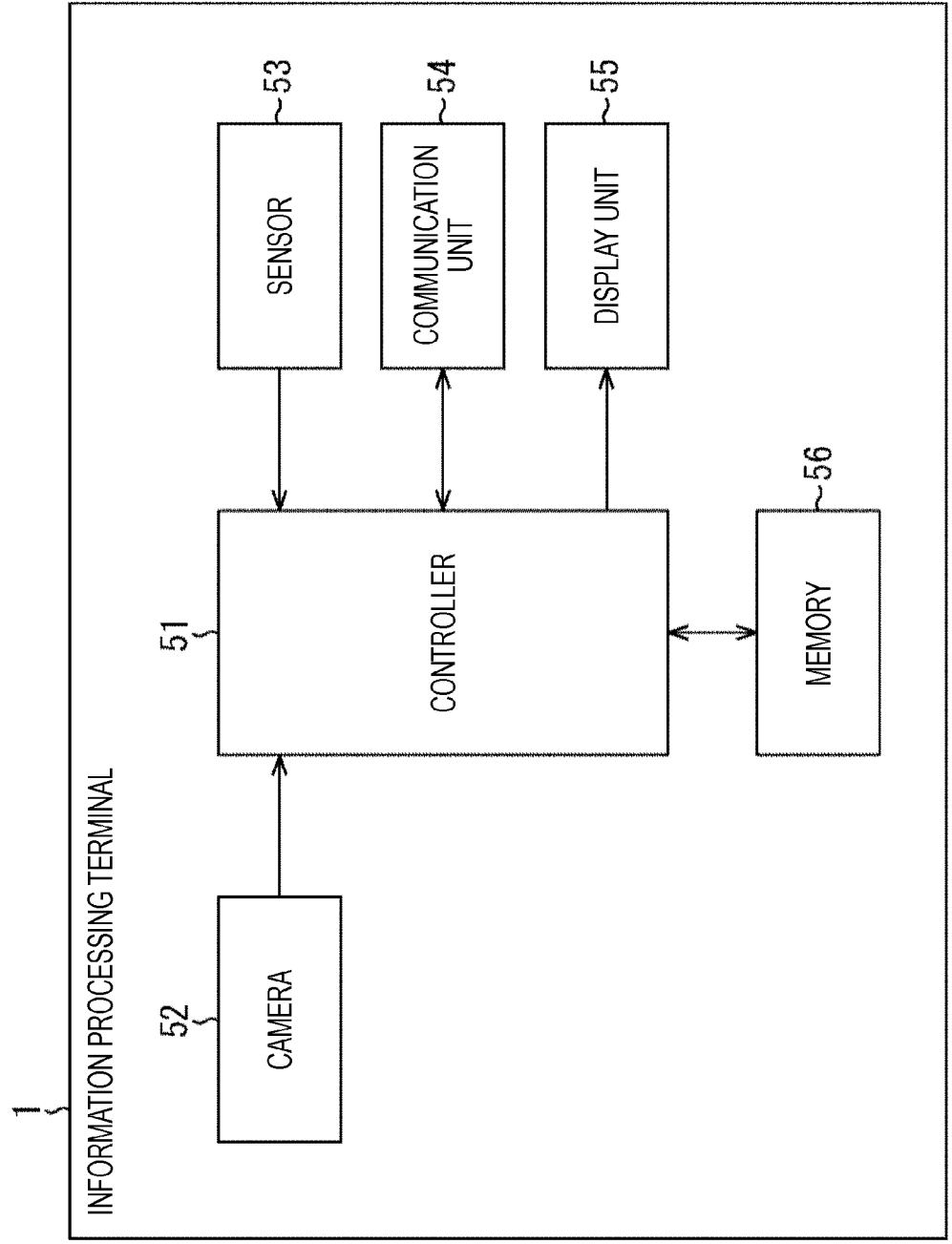

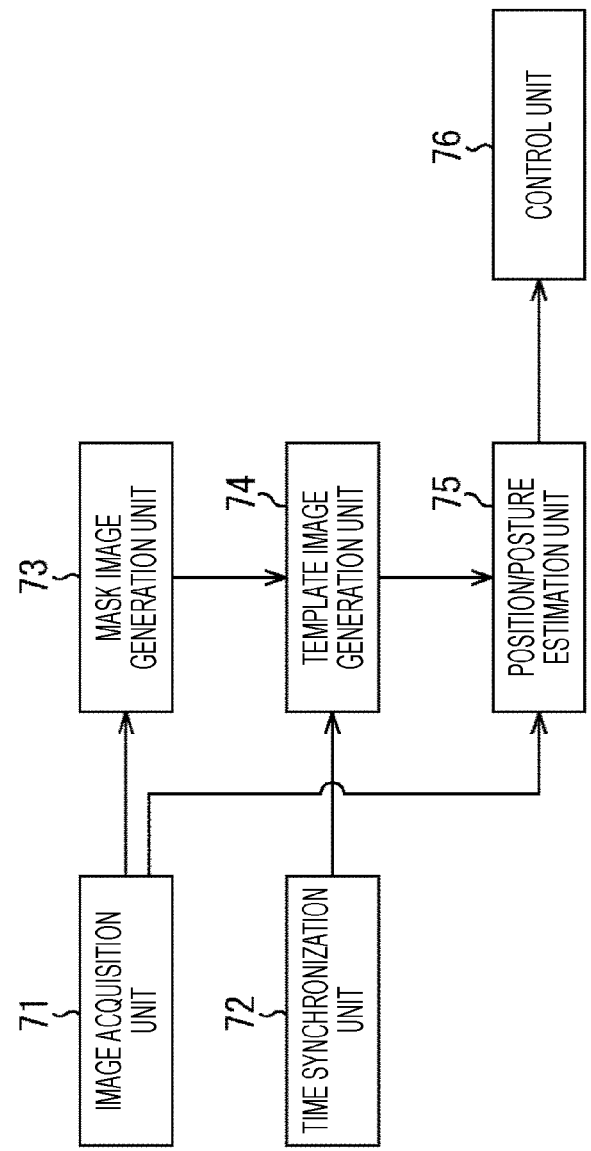

FIG. 12
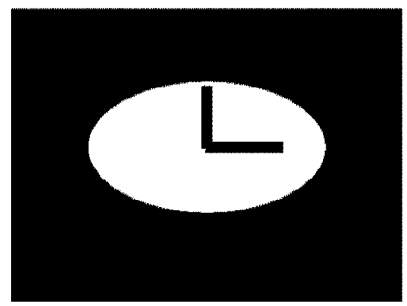
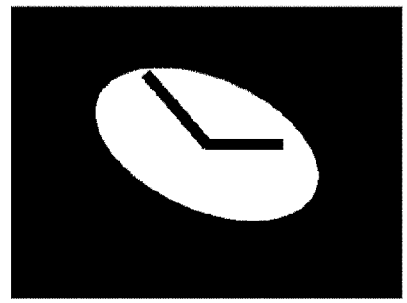
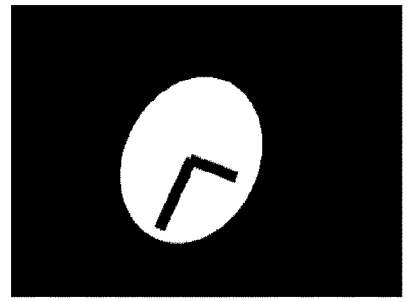

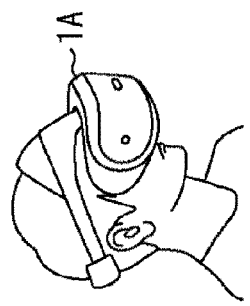
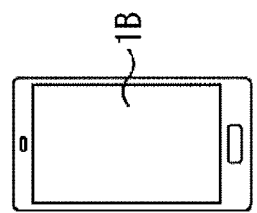
FIG. 19A
FIG. 19B

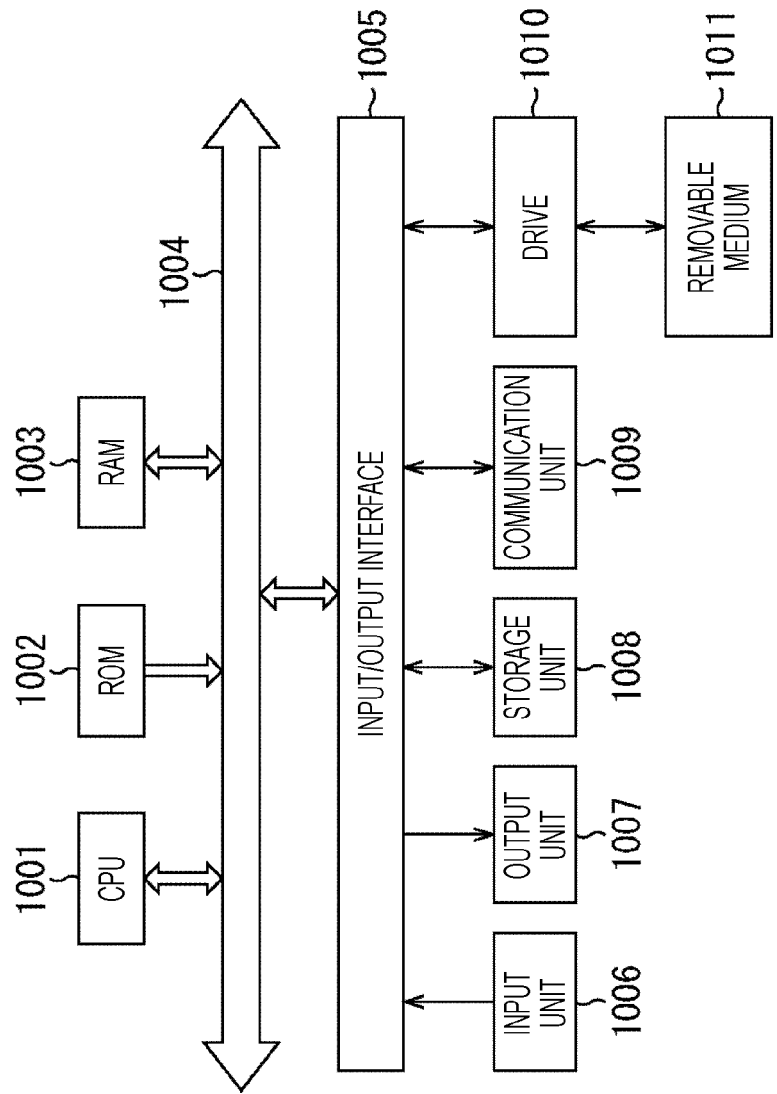

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/011449 filed on Mar. 16, 2020, which claims priority benefit of Japanese Patent Application No. JP 2019-063440 filed in the Japan Patent Office on Mar. 28, 2019. Each of the above-referenced applications is hereby incorporated herein by reference in its entirety.

TECHNICAL FIELD

The present technology relates to an information processing apparatus, an information processing method, and a program, and more particularly, to an information processing apparatus, an information processing method, and a program capable of performing an operation using a wearable device that is less resistant to being worn all the times.

BACKGROUND ART

There is a technology for detecting a position and a posture of a device worn by a user by analyzing an image of a camera, and controlling display of augmented reality (AR) according to a gesture of the user. The device worn by the user will be used as an AR controller that controls the display of AR.

Patent Document 1 discloses a technique in which a plane on a housing is specified by detecting markers prepared at four corners of the housing attached to a bracelet worn by a user, and a virtual stereoscopic image is synthesized with the specified plane and displayed.

CITATION LIST

Patent Document

Patent Document 1: Japanese Patent Application Laid-Open No. 2000-98300

SUMMARY OF THE INVENTION

Problems to be Solved by the Invention

In the case of the above-described technology, the user needs to wear a dedicated bracelet.

Since it is necessary to print a complicated texture such as a marker on the housing, the fashion of the device is impaired. In addition, since it is necessary to detect a plurality of markers, a processing amount for extracting a feature point increases.

The present technology has been made in view of such a situation, and enables an operation to be performed using a wearable device that is less resistant to being worn at all times.

Solutions to Problems

An information processing apparatus according to one aspect of the present technology includes: an acquisition unit that acquires a captured image obtained by capturing an image of a wearable device including a module whose appearance changes according to time; and an estimation unit that detects the module appearing in the captured image on the basis of an image indicating an appearance of the module according to a current time, and estimates at least one of a position or a posture of the wearable device.

In one aspect of the present technology, a captured image obtained by capturing an image of a wearable device including a module whose appearance changes according to time is acquired, the module appearing in the captured image is detected on the basis of an image representing an appearance of the module according to a current time, and at least one of a position or a posture of the wearable device is estimated.

BRIEF DESCRIPTION OF DRAWINGS

FIG. 4 is a block diagram illustrating a configuration example of an information processing terminal.

FIG. 5 is a block diagram illustrating a functional configuration example of a controller.

FIG. 12 is a diagram illustrating an example of a template image.

FIGS. 19A and 19B are diagrams illustrating another example of the information processing terminal.

FIG. 20 is a block diagram illustrating a configuration example of a computer.

MODE FOR CARRYING OUT THE INVENTION

Hereinafter, modes for carrying out the present technology will be described. Further, the description will be given in the following order.

1. Example of matching using template image for each time
2. Example of matching using template image for each posture
3. Example of estimating position and posture by image processing
4. Configuration of Wristwatch
5. Other Examples

1. Example of Matching Using Template Image for Each Time

<Example of Using Wristwatch as AR Controller>

Figure 1:
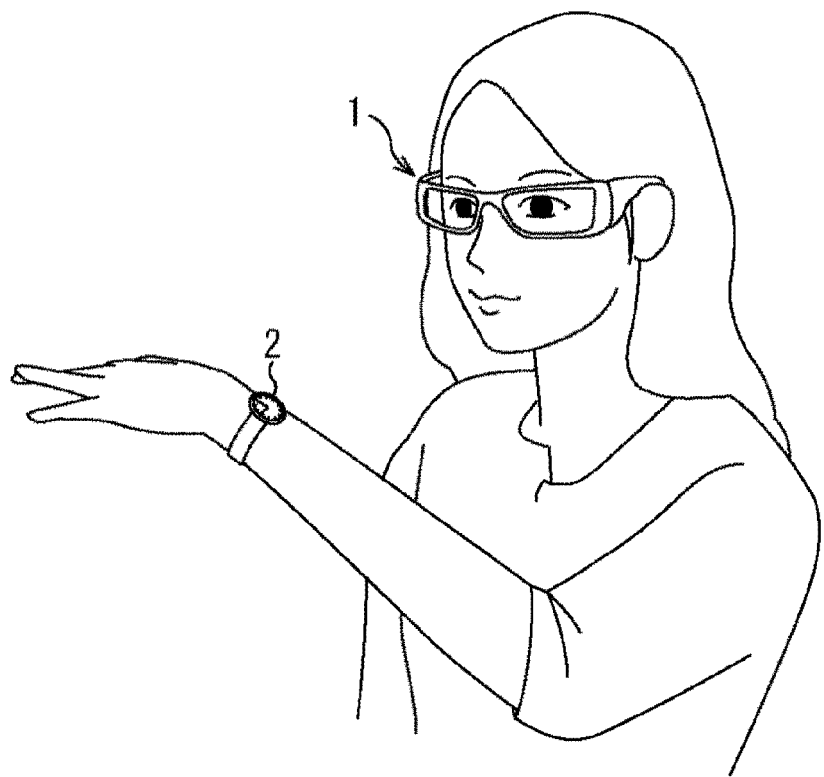
FIG. 1 is a diagram illustrating a wearing example of a wearable device according to an embodiment of the present technology.

FIG. 1 is a diagram illustrating a wearing example of a wearable device according to an embodiment of the present technology.

As illustrated in FIG. 1, an information processing terminal 1 is a glasses-type wearable device including a transmissive display unit. The information processing terminal 1 causes the display unit to display various types of information read from a built-in memory or acquired via the Internet, for example.

The information processing terminal 1 is a wearable device equipped with an AR function for displaying various types of information superimposed on an actual scene. The user sees various types of information such as characters and images superimposed on the scenery in front of the user.

The display method by the AR function may be a virtual image projection method or a retinal projection method in which an image is directly formed on the retina of the user's eye. In addition, the image displayed to be superimposed on the actual scene may be a two-dimensional image or a three-dimensional image in which an object such as a character appears stereoscopically.

The information processing terminal 1 is provided with a camera that captures an image of the front of the user wearing the head. The information processing terminal 1 analyzes the image captured by the camera to estimate the position and posture of a wristwatch 2 worn by the user, and detects a gesture operation on the basis of the transition of the position and posture.

The information processing terminal 1 performs various processes such as controlling the content displayed by the AR function and controlling an external device according to the gesture operation of the user.

That is, the wristwatch 2, which is a wearable device, is used as the AR controller of the information processing terminal 1 equipped with the AR function. The user can operate the information processing terminal 1 by moving the left arm wearing the wristwatch 2.

Figure 2:
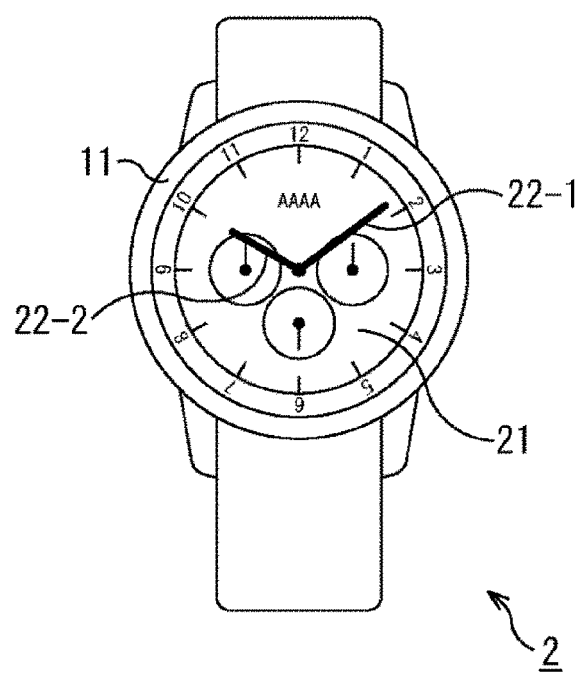
FIG. 2 is a front view illustrating an appearance of a wristwatch.

FIG. 2 is a front view illustrating an appearance of the wristwatch 2.

As illustrated in FIG. 2, the wristwatch 2 is an analog type wristwatch. A long hand 22-1 and a short hand 22-2 are provided on a dial 21 of a case 11 having a substantially perfect circle. Hereinafter, when it is not necessary to distinguish the long hand 22-1 and the short hand 22-2 as appropriate, they are collectively referred to as a clock hand 22.

Three chronographs are provided at positions near the center of the dial 21, and indexes such as scales and numbers are provided along the periphery. Furthermore, a logo is printed above the center of the dial 21. In the example of FIG. 2, a logo of "AAAA" is printed.

The information processing terminal 1 in FIG. 1 estimates the position and posture of such an analog type wristwatch 2 on the basis of the captured image obtained by capturing with the camera. Since the direction pointed by the clock hand 22 changes according to the time, the wristwatch 2 is a wearable device having a dial 21 whose appearance changes according to the time.

In order to estimate the position and posture of the wristwatch 2, the information processing terminal 1 needs to detect a predetermined module of the wristwatch 2, such as the dial 21, from among objects shown in the captured image. The information processing terminal 1 estimates the position and posture of the dial 21 in the three-dimensional space on the basis of the detected position and shape of the dial 21 in the captured image, the direction of the clock hand 22 provided on the dial 21, and the like. The position and posture of the dial 21 represent the position and posture of the wristwatch 2.

Figure 3A:
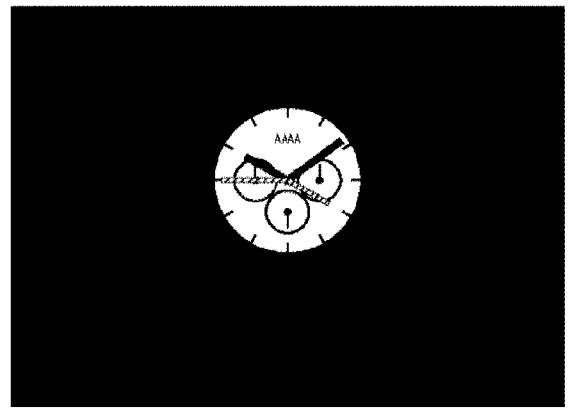
FIGS. 3A, 3B, and 3C are diagrams illustrating an example of a template image.
Figure 3B:
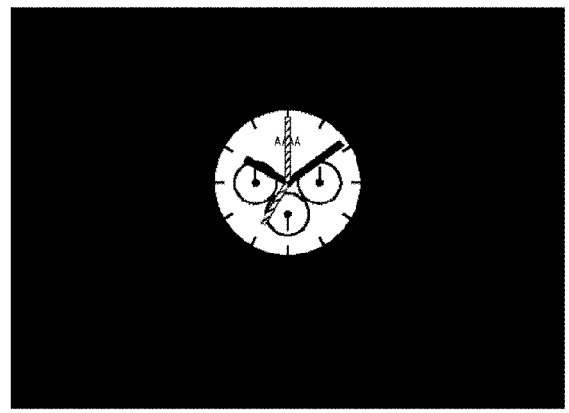
Figure 3C:
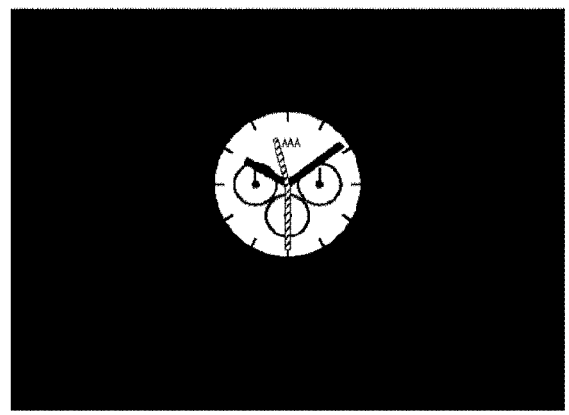

FIGS. 3A, 3B, and 3C are diagrams illustrating an example of a template image used to detect the dial 21.

Here, the template image is an image used for matching with each part of the captured image (detection of a region in which the same object is captured). The dial 21 is detected by pattern matching using a template image.

In the template image illustrated in-A of FIG. 3A, a region outside the perfect circular dial 21 in the image representing the appearance of the wristwatch 2 and a region of the clock hand 22 representing "10:10" in the region inside the dial 21 are masked. The image representing the appearance of the wristwatch 2 used to generate the template image is, for example, an image registered in advance at the time of calibration before detecting the dial 21. In FIGS. 3A, 3B, and 3C, a region denoted by black is a mask region.

In addition, in the template image illustrated in FIG. 3A, an image of the clock hand 22 representing "3:45" is combined with a region of the dial 21. A clock hand indicating "3:45" hatched is an image of the clock hand 22 synthesized by the image processing.

The template image illustrated in FIG. 3A is an image used when the dial 21 is detected at "3:45".

Similarly, in the template image illustrated in FIG. 3B, the region outside the dial 21 and the region of the clock hand 22 representing "10:10" in the region inside the dial 21 are masked.

In addition, in the template image illustrated in FIG. 3B, an image of the clock hand 22 representing "7:00" is combined with the region of the dial 21.

The template image illustrated in FIG. 3B is an image used when the dial 21 is detected at "7:00".

Similarly, in the template image illustrated in FIG. 3C, the region outside the dial 21 and the region of the clock hand 22 indicating "10:10" in the region inside the dial 21 are masked.

In addition, in the template image illustrated in FIG. 3C, an image of the clock hand 22 representing "11:30" is combined with the region of the dial 21.

A template image illustrated in FIG. 3C is an image used when the dial 21 is detected at "11:30".

As described above, in the information processing terminal 1, the time at which the dial 21 is detected is set as the current time, and the image of the dial 21 representing the current time is generated as the template image for each current time and used for matching.

The information processing terminal 1 can estimate the position of the dial 21 by using the image of the dial 21 indicating the current time as the template image. Furthermore, the information processing terminal 1 can estimate the posture of the dial 21 from the direction of the clock hand 22.

That is, the information processing terminal 1 can estimate the position and posture of the wristwatch 2.

In addition, since a complicated texture such as a marker used for detecting the position and the posture is unnecessary, the user can use a normal wristwatch as the AR controller without impairing the fashion.

Details of processing such as generation of the template image and matching using the template image will be described later.

<Configuration Example of Information Processing Terminal>

FIG. 4 is a block diagram illustrating a configuration example of the information processing terminal 1.

As illustrated in FIG. 4, the information processing terminal 1 is configured by connecting a camera 52, a sensor 53, a communication unit 54, a display unit 55, and a memory 56 to a controller 51.

The controller 51 includes a central processing unit (CPU), a read only memory (ROM), a random access memory (RAM), and the like. The controller 51 executes a program stored in the ROM or the memory 56 and controls the overall operation of the information processing terminal 1.

For example, the controller 51 estimates the position and posture of the wristwatch 2 on the basis of the captured image supplied from the camera 52, and detects the gesture operation of the user. The controller 51 executes various processes in accordance with the detected gesture operation.

The camera 52 captures a scenery in front of the user. The camera 52 outputs a captured image obtained by performing capturing to the controller 51.

Note that the camera 52 is a camera for visible light detection. The image captured by the camera 52 is an RGB image.

The image captured by the camera 52 is also used, for example, to estimate the position and posture of the information processing terminal 1 itself.

The sensor 53 includes a depth sensor or light detection and ranging (LiDAR). The depth sensor and the LiDAR constituting the sensor 53 measure the distance to each position of the object, and output a distance image, point cloud data, and the like to the controller 51 as data indicating a measurement result.

The sensor 53 appropriately includes various sensors such as an acceleration sensor, a gyro sensor, and a positioning sensor. The measurement results of the acceleration sensor, the gyro sensor, and the positioning sensor are used for estimation of the position, posture, and the like of the information processing terminal 1.

The communication unit 54 includes a communication module of a portable communication network, a communication module of a wireless LAN, and the like. The communication unit 54 communicates with an external device via a network.

The display unit 55 displays various types of information such as characters and images as AR content under the control of the controller 51.

The memory 56 is a storage medium such as a flash memory. The memory 56 stores various data such as a program executed by the CPU of the controller 51.

FIG. 5 is a block diagram illustrating a functional configuration example of the controller 51.

At least a part of the functional units illustrated in FIG. 5 is realized by executing a predetermined program by the CPU constituting the controller 51 in FIG. 4.

As illustrated in FIG. 5, the controller 51 includes an image acquisition unit 71, a time synchronization unit 72, a mask image generation unit 73, a template image generation unit 74, a position/posture estimation unit 75, and a control unit 76.

The image acquisition unit 71 acquires a photographed image obtained by photographing by the camera 52. The captured image acquired at the time of calibration is supplied to the mask image generation unit 73, and the captured image acquired at the time of matching is supplied to the position/posture estimation unit 75.

The time synchronization unit 72 synchronizes the time of the internal clock of the information processing terminal 1 with the time of the wristwatch 2. The time information of the internal clock synchronized with the time of the wristwatch 2 is supplied to the template image generation unit 74.

The time synchronization is established, for example, by both the information processing terminal 1 and the wristwatch 2 receiving radio waves including information on the standard time.

Both the information processing terminal 1 and the wristwatch 2 may access a network time protocol (NTP) server, and time synchronization may be established on the basis of information received from the NTP server.

In a case where the wristwatch 2 has a radio communication function, radio communication may be performed between the information processing terminal 1 and the wristwatch 2 to establish time synchronization.

The time of the wristwatch 2 may be detected by analyzing the image captured by the camera 52, and a deviation from the time of the internal clock may be specified. According to the deviation between the time of the wristwatch 2 and the time of the internal clock, the information of the current time used when the matching is performed is corrected. Furthermore, not only the deviation between the time of the wristwatch 2 and the time of the internal clock, but also the design of the hand or the panel of the wristwatch owned by the user may be stored.

The mask image generation unit 73 generates a mask image used for generating a template image on the basis of the captured image supplied from the image acquisition unit 71. The mask image generated by the mask image generation unit 73 is supplied to the template image generation unit 74.

On the basis of the mask image supplied from the mask image generation unit 73, the template image generation unit 74 generates a template image for each time at which the dial 21 is detected. The template image generated by the template image generation unit 74 is supplied to the position/posture estimation unit 75.

The position/posture estimation unit 75 performs matching between each part of the captured image supplied from the image acquisition unit 71 and the template image generated by the template image generation unit 74, and detects the dial 21 appearing in the captured image. The position/posture estimation unit 75 estimates the position and posture of the wristwatch 2 on the basis of the position and shape of the dial 21 appearing in the captured image, the direction of the clock hand 22, and the like. Information indicating the estimation results of the position and posture of the wristwatch 2 is supplied to the control unit 76. Instead of estimating both the position and posture of the wristwatch 2, only one of them may be estimated.

The control unit 76 performs various processes such as controlling the content displayed by the AR function and controlling an external device on the basis of the estimation result of the position and posture of the wristwatch 2. The control unit 76 functions as a display control unit that controls display of various types of information by AR, and also functions as an operation control unit that controls operation of an external device.

<Operation of Information Processing Terminal 1>

Here, the operation of the information processing terminal 1 having the above configuration will be described.

First, the calibration process will be described with reference to the flowchart of FIG. 6.

The calibration process is, for example, a process performed in advance before the position and posture of the wristwatch 2 are estimated.

In step S11, the controller 51 causes the display unit 55 to display a guide image serving as a guide of the dial region.

In step S12, the image acquisition unit 71 causes the camera 52 to capture the wristwatch 2 whose position is guided according to the guide image.

Figure 7:
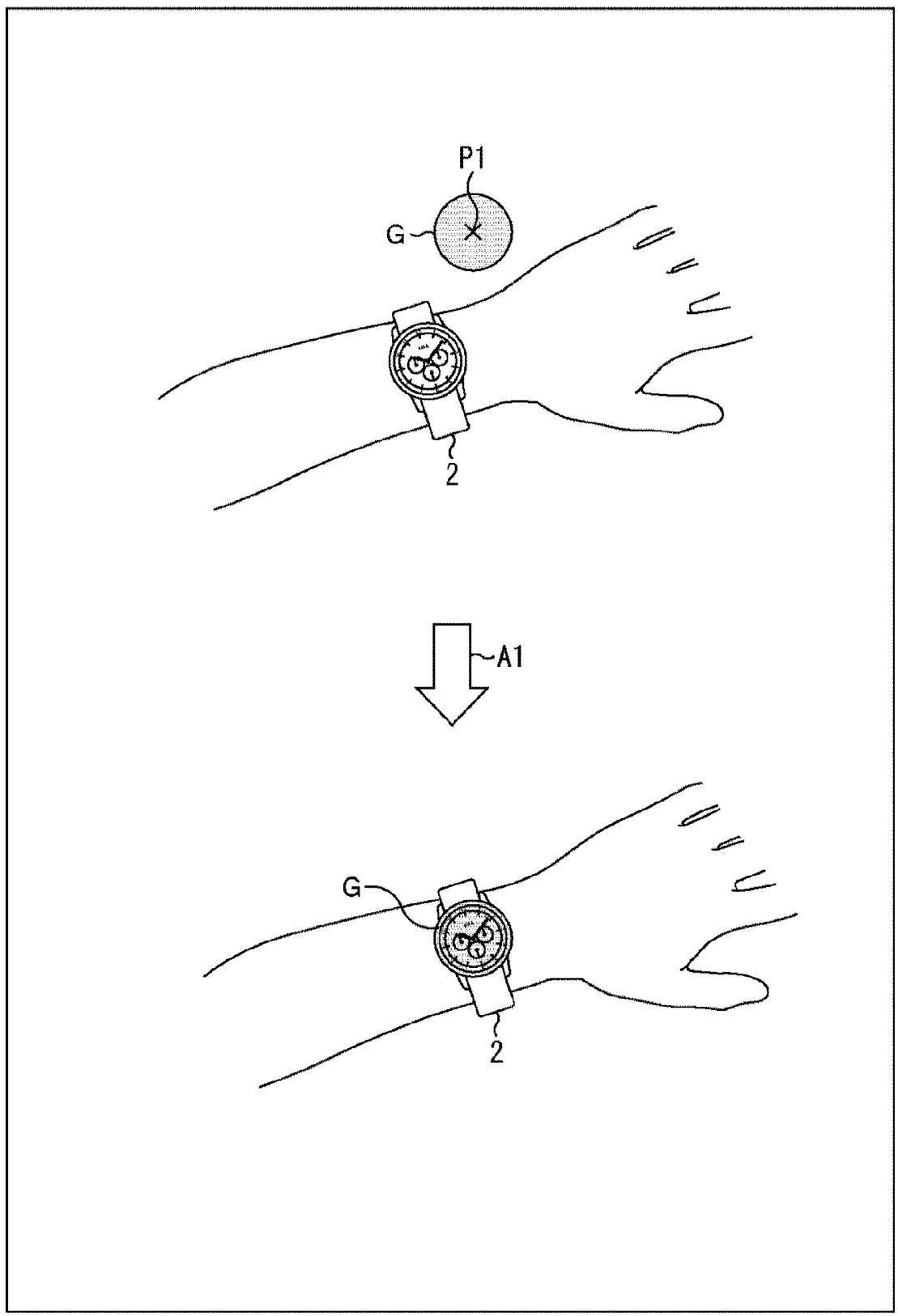
FIG. 7 is a diagram illustrating a display example of a guide image.

FIG. 7 is a diagram illustrating a display example of a guide image.

An image G displayed at a position P1 in the upper part of FIG. 7 is a guide image serving as a guide of the dial region. In the example of FIG. 7, a circular image G of a predetermined color is displayed as a guide image.

Such a guide image is displayed to be superimposed on the scenery in front while the display position is fixed. The user moves his/her arm so that the dial 21 of the wristwatch 2 fits inside the guide image.

As indicated by the tip of arrow A1, photographing is performed in a state where the dial 21 of the wristwatch 2 is inside the guide image. The photographed image obtained by photographing the wristwatch 2 is supplied to the mask image generation unit 73 together with the information of the range of the guide image.

Figure 6:
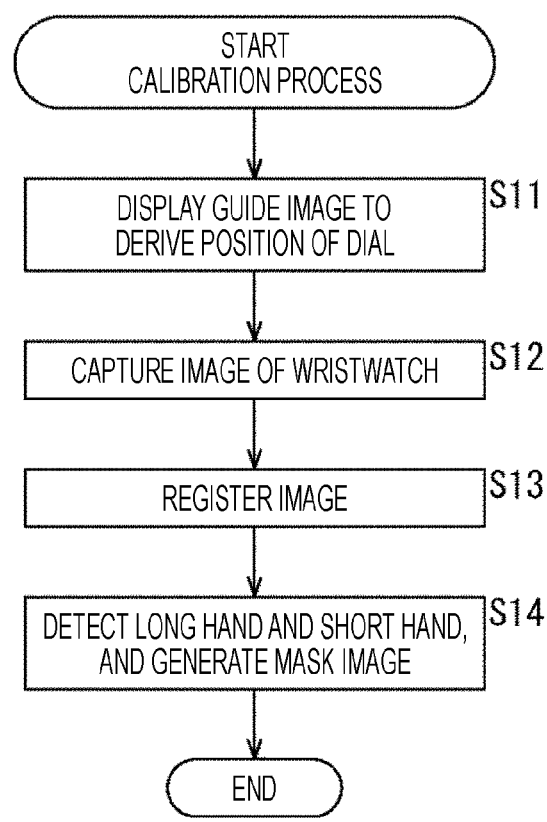
FIG. 6 is a flowchart for explaining a calibration process.

In step S13 of FIG. 6, the mask image generation unit 73 registers the captured image supplied from the image acquisition unit 71. The captured image showing the wristwatch 2 is managed as a registered image.

In step S14, the mask image generation unit 73 detects the long hand 22-1 and the short hand 22-2 by analyzing the region of the dial 21 on which the guide image is superimposed in the registered image. The mask image generation unit 73 generates a mask image that masks the region outside the dial 21 and the region of the clock hand 22 inside the dial 21.

Figure 8:
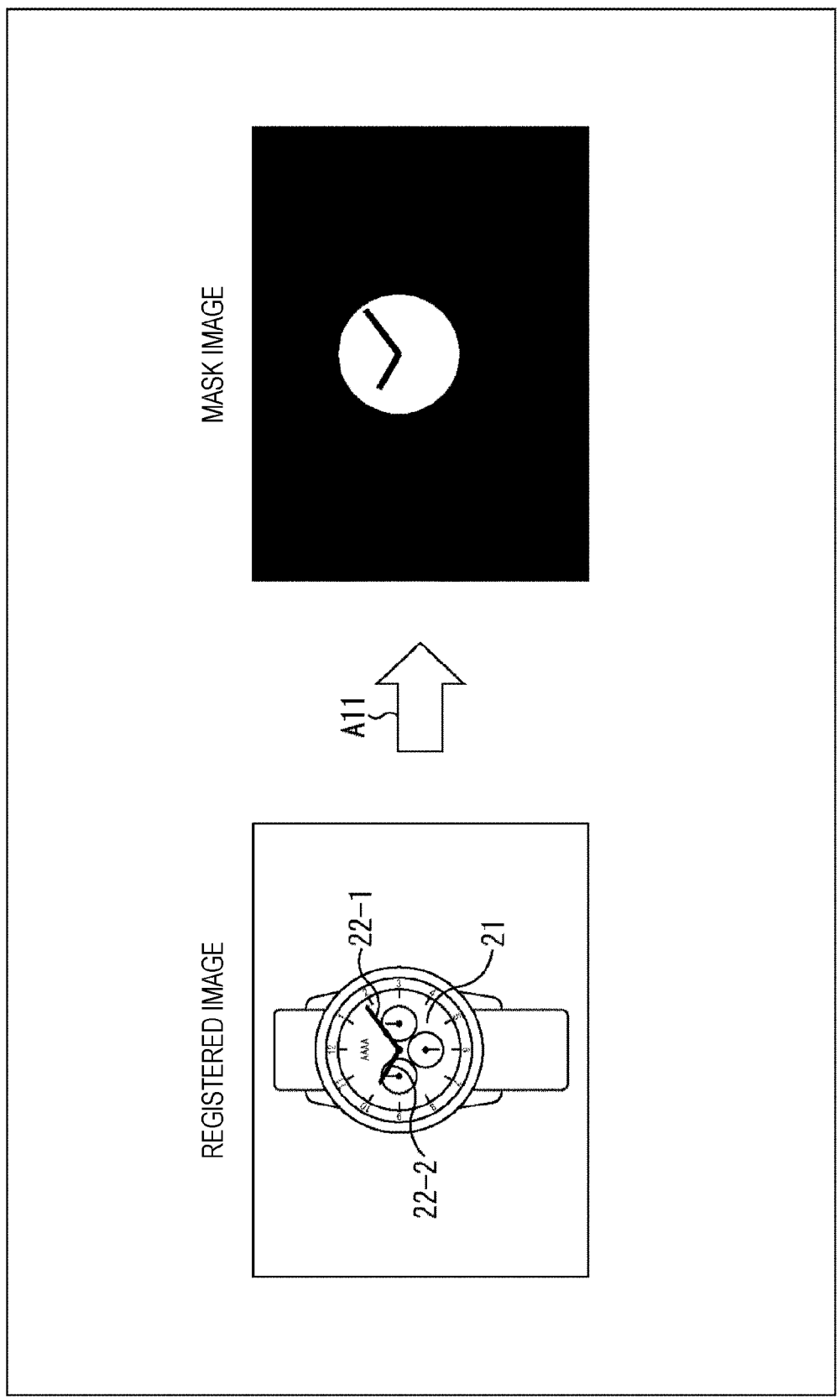
FIG. 8 is a diagram illustrating an example of generating a mask image.

FIG. 8 is a diagram illustrating an example of generating a mask image.

As illustrated on the left side of FIG. 8, the registered image shows the wristwatch 2 photographed by aligning the position of the dial 21 with the guide image.

The clock hand 22 representing "10:10" is detected on the basis of such a registered image, and a mask image that masks the region outside the dial 21 and the region of the clock hand 22 as indicated by a tip of arrow A11 is generated.

Note that, in a case where the calibration time is, for example, "10:10", the clock hand 22 is at a position indicating "10:10". The clock hand 22 may be detected in a predetermined range based on a position indicating "10:10". Therefore, the detection accuracy of the clock hand 22 can be enhanced.

After the mask image is generated, the calibration process ends.

Next, a position/posture estimation process will be described with reference to the flowchart of FIG. 9.

Figure 9:
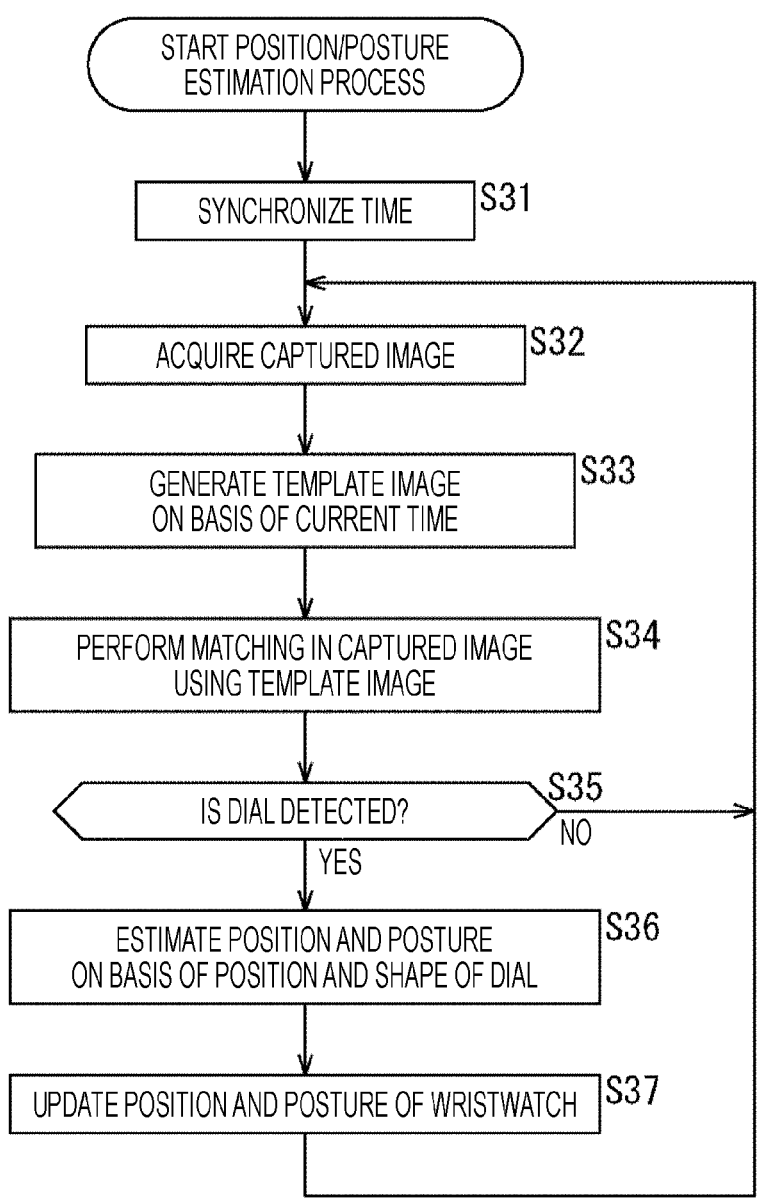
FIG. 9 is a flowchart for explaining a position/posture estimation process.

The position/posture estimation process in FIG. 9 is started, for example, after the calibration process is performed and when a gesture operation of the user is detected.

In step S31, the time synchronization unit 72 synchronizes the time of the internal clock of the information processing terminal 1 with the time of the wristwatch 2.

In step S32, the image acquisition unit 71 causes the camera 52 to capture an image and acquires a captured image. The captured image acquired by the image acquisition unit 71 is supplied to the position/posture estimation unit 75.

In step S33, the template image generation unit 74 refers to the time information supplied from the time synchronization unit 72 and generates a template image on the basis of the current time.

Figure 10:
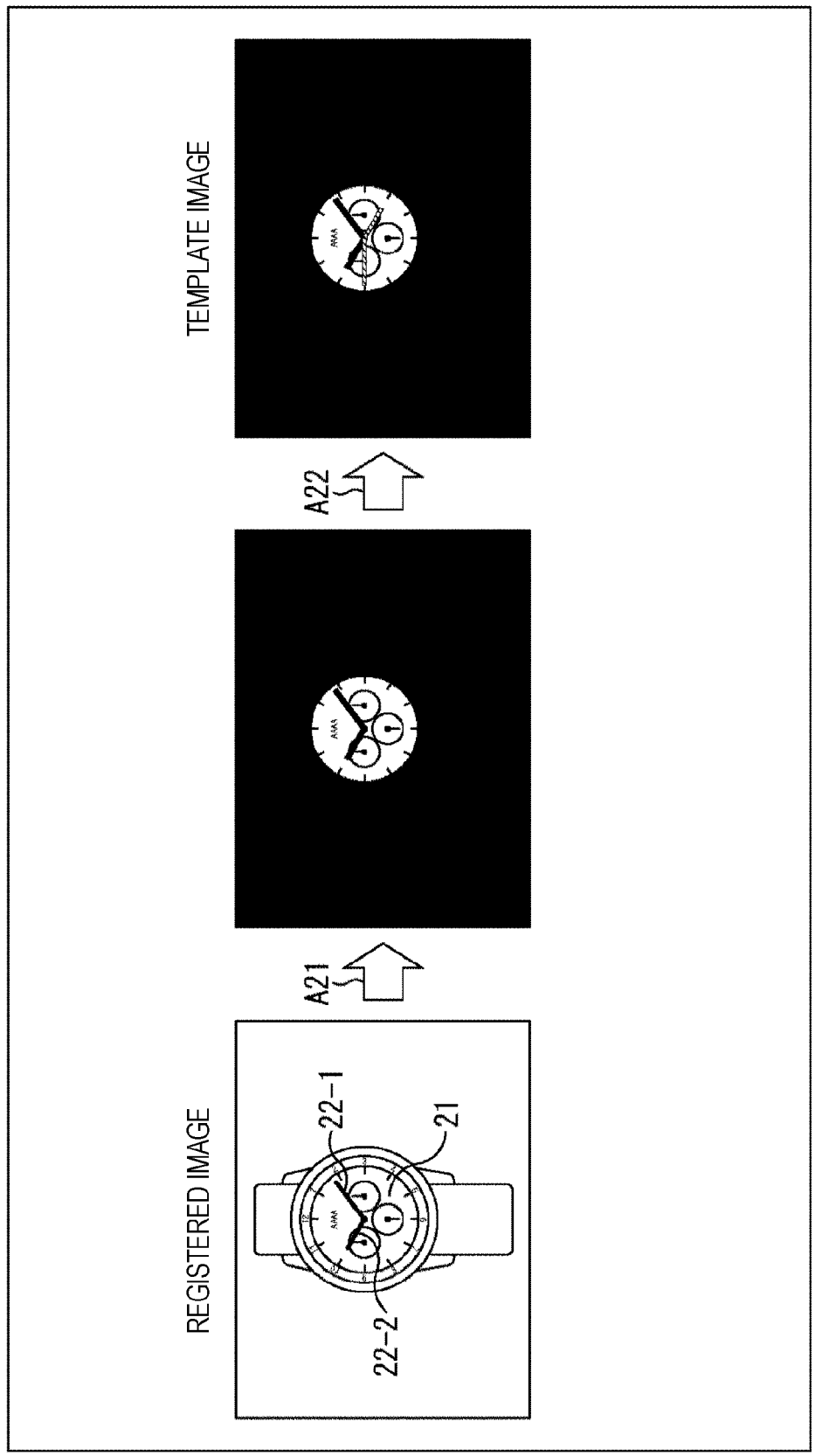
FIG. 10 is a diagram illustrating an example of generation of a template image.

FIG. 10 is a diagram illustrating an example of generation of a template image.

In a case where the registered image illustrated on the left side of FIG. 10 is prepared, the template image generation unit 74 masks the region outside the dial 21 and the region of the clock hand 22 on the basis of the mask image as indicated by a tip of arrow A21.

The masked image includes information on the region inside the dial 21 other than the region of the clock hand 22 representing, for example, "10:10" that is the calibration time.

In addition, the template image generation unit 74 generates a template image by synthesizing an image of the clock hand 22 representing the current time with the masked image as indicated by a tip of arrow A22.

For example, in a case where the current time is "3:45", an image of the clock hand 22 representing "3:45" is synthesized. In the template image illustrated at the right end of FIG. 10, a hand indicating "3:45" hatched is an image synthesized by image processing.

Returning to the description of FIG. 9, in step S34, the position/posture estimation unit 75 performs matching with each portion of the captured image using the template image generated by the template image generation unit 74. For example, a perfect circular template image as illustrated in FIG. 10 is deformed so as to represent appearance when viewed from various angles, and matching is performed using the deformed template image.

In step S35, the position/posture estimation unit 75 determines whether or not the dial 21 has been detected by matching using the template image.

In a case where the dial 21 is not detected, the processing returns to step S32, and the above processing is repeated. The template image is updated, and matching is repeated using the updated template image.

In a case where it is determined in step S35 that the dial 21 has been detected, in step S36, the position/posture estimation unit 75 estimates the position and posture of the dial 21 on the basis of the position and shape of the dial 21 appearing in the captured image, the direction of the clock hand 22, and the like.

In step S37, the position/posture estimation unit 75 updates information on the position and posture of the wristwatch 2 represented by the position and posture of the dial 21. Thereafter, the processing returns to step S32, and the above processing is repeated.

By repeating the above processing, the control unit 76 detects the gesture operation of the user on the basis of the time series of the position and posture of the wristwatch 2.

Through the above processing, the information processing terminal 1 can easily estimate the position and posture of the wristwatch 2.

For example, in a case where the processing is performed on the basis of only the position and shape (perfect circle or ellipse) of the dial 21 appearing in the captured image, the information processing terminal 1 can estimate the position of the dial 21, but cannot estimate the direction of the wristwatch 2 in the vertical direction or the like.

By considering the direction of the hand indicating the current time, the information processing terminal 1 can also estimate the direction of the wristwatch 2 in the vertical direction or the like.

In addition, the user can use a normal wristwatch as the AR controller.

In a case where it is assumed that the information processing terminal 1 is always worn indoors and outdoors, the user is required to always wear the AR controller. By using the wristwatch 2 that is less resistant to being worn on a steady basis as the AR controller, it is possible to wear the AR controller on a steady basis without difficulty in a state where fashion is maintained. The user can wear the AR controller at all times, and can obtain an interactive experience using gesture operations and display of the AR object.

2. Example of Matching Using Template Image for Each Posture

Although the estimation of the position and posture of the wristwatch 2 is performed on the basis of the RGB image captured by the camera 52, which is a camera for visible light detection, it is also possible to perform similar processing on the basis of an IR image captured by the IR camera.

In this case, the information processing terminal 1 is provided with an IR light irradiation device and an IR camera that detects reflected light of the IR light emitted by the irradiation device and generates an IR image as a captured image.

Figure 11:
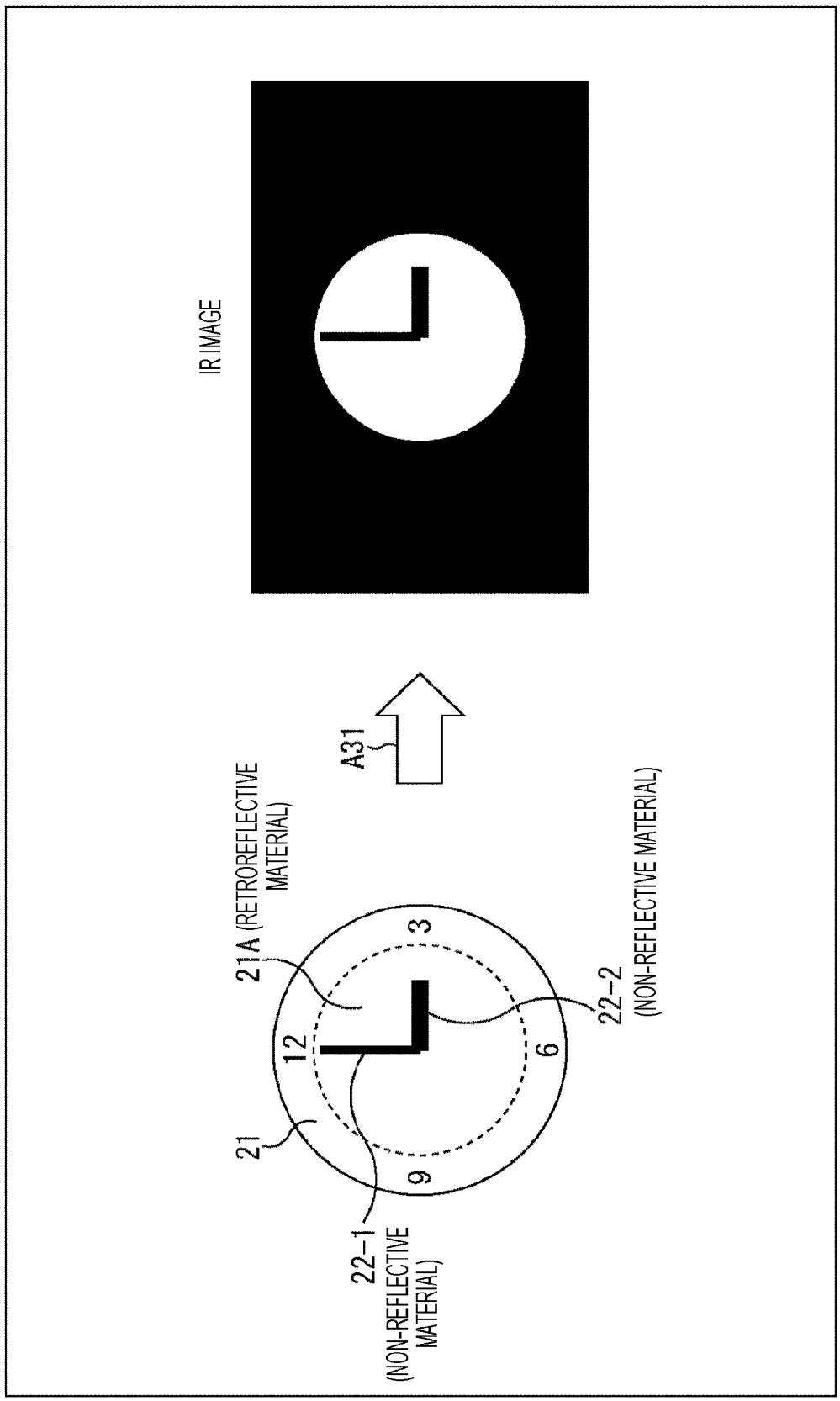
FIG. 11 is an enlarged view of a dial of the wristwatch.

FIG. 11 is an enlarged view of the dial 21 of the wristwatch 2.

As indicated by a broken line on the left side of FIG. 11, a reflecting portion 21A including a retroreflective material for IR light is formed on the dial 21. In the example of FIG. 11, the reflecting portion 21A is formed in a perfect circular range including a range in which the long hand 22-1 and the short hand 22-2 rotate.

The retroreflective material is a material that reflects light at the same angle as the incident angle. The IR light with which the reflecting portion 21A is irradiated is reflected at the same angle as the incident angle.

The long hand 22-1 and short hand 22-2 provided on the dial 21 on which the reflecting portion 21A is formed include a non-reflective material for IR light.

In a case where the dial 21 having such a configuration is irradiated with IR light and captured by an IR camera, an IR image as indicated by a tip of arrow A31 is acquired as a captured image.

In the IR image shown in FIG. 9, a portion other than the long hand 22-1 and the short hand 22-2 indicating "15:00" inside the reflecting portion 21A is shown with predetermined brightness. The outside of the reflecting portion 21A and the portion of the clock hand 22 indicating "15:00" appear in a dark state.

In the information processing terminal 1, a template image for each posture of the dial 21 is generated on the basis of the shape of the reflecting portion 21A appearing in the IR image.

FIG. 12 is a diagram illustrating an example of a template image.

As illustrated in FIG. 12, a template image for each posture is generated by deforming the dial 21 representing the current time so as to represent appearance when viewed from various angles.

For example, an image of the clock hand 22 representing the current time is synthesized with a circle representing the shape of the reflecting portion 21A, and the synthesized image is deformed to represent appearance when viewed from various angles, thereby generating a template image.

By performing such matching between the template image and each part of the IR image, the dial 21 appearing in the IR image is detected.

Figure 13:
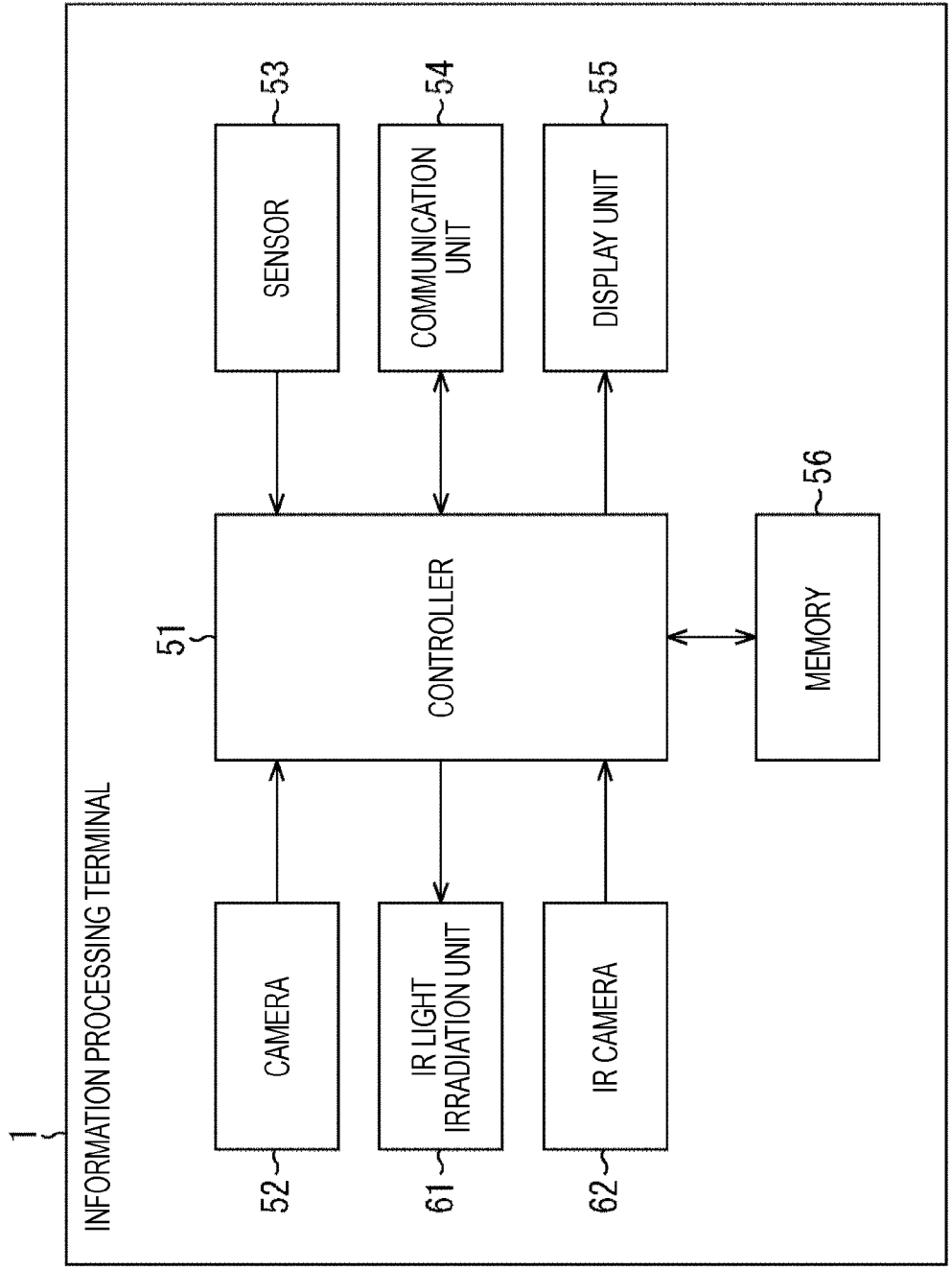
FIG. 13 is a block diagram illustrating a configuration example of an information processing terminal.

FIG. 13 is a block diagram illustrating a configuration example of the information processing terminal 1.

The configuration of the information processing terminal 1 illustrated in FIG. 13 is different from the configuration of FIG. 4 in that an IR light irradiation unit 61 and an IR camera 62 are provided. In the configuration illustrated in FIG. 13, the same components as those illustrated in FIG. 4 are denoted by the same reference numerals as those used in FIG. 4. Overlapping description will be omitted as appropriate.

The IR light irradiation unit 61 is an irradiation device that emits IR light. The IR light irradiation unit 61 emits IR light when a gesture operation of the user is detected.

The IR camera 62 detects reflected light of IR light emitted by the IR light irradiation unit 61 and generates an IR image as a captured image. The IR image generated by the IR camera 62 is supplied to the controller 51. The IR camera 62 is provided, for example, in the vicinity of the IR light irradiation unit 61.

In the controller 51 of FIG. 13, the same configuration as each configuration of FIG. 5 is realized by executing a predetermined program.

Here, the position/posture estimation process will be described with reference to the flowchart of FIG. 14.

Figure 14:
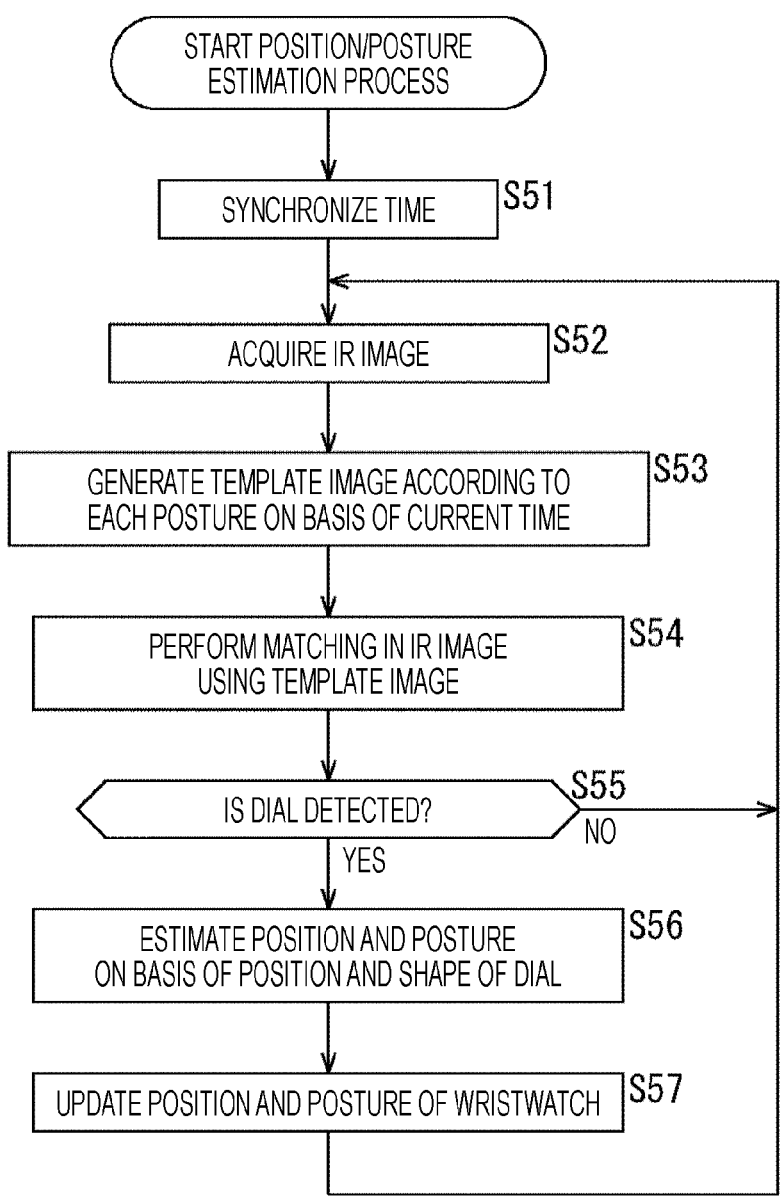
FIG. 14 is a flowchart for explaining a position/posture estimation process.

The position/posture estimation process in FIG. 14 is started when a gesture operation of the user is detected.

In step S51, the time synchronization unit 72 synchronizes the time of the internal clock of the information processing terminal 1 with the time of the wristwatch 2.

In step S52, the image acquisition unit 71 causes the IR camera 62 to capture an image and acquires an IR image. The IR image acquired by the image acquisition unit 71 is supplied to the position/posture estimation unit 75.

In step S53, the template image generation unit 74 refers to the time information supplied from the time synchronization unit 72, and generates a template image corresponding to each posture on the basis of the current time.

In step S54, the position/posture estimation unit 75 performs matching with each portion of the IR image using the template image generated by the template image generation unit 74.

In step S55, the position/posture estimation unit 75 determines whether or not the dial 21 has been detected by matching using the template image.

In a case where the dial 21 is not detected, the processing returns to step S52, and the above processing is repeated. The template image is updated, and matching is repeated using the updated template image.

In a case where it is determined in step S55 that the dial 21 has been detected, in step S56, the position/posture estimation unit 75 estimates the position and posture of the dial 21 on the basis of the position and shape of the dial 21 appearing in the IR image, the direction of the clock hand 22, and the like.

In step S57, the position/posture estimation unit 75 updates information on the position and posture of the wristwatch 2 represented by the position and posture of the dial 21. Thereafter, the processing returns to step S52, and the above processing is repeated.

By repeating the above processing, the control unit 76 detects the gesture operation of the user on the basis of the time series of the position and posture of the wristwatch 2.

By using the IR image as described above, the estimation accuracy of the position and posture of the wristwatch 2 can be improved.

3. Example of Estimating Position and Posture by Image Processing

Figure 15:
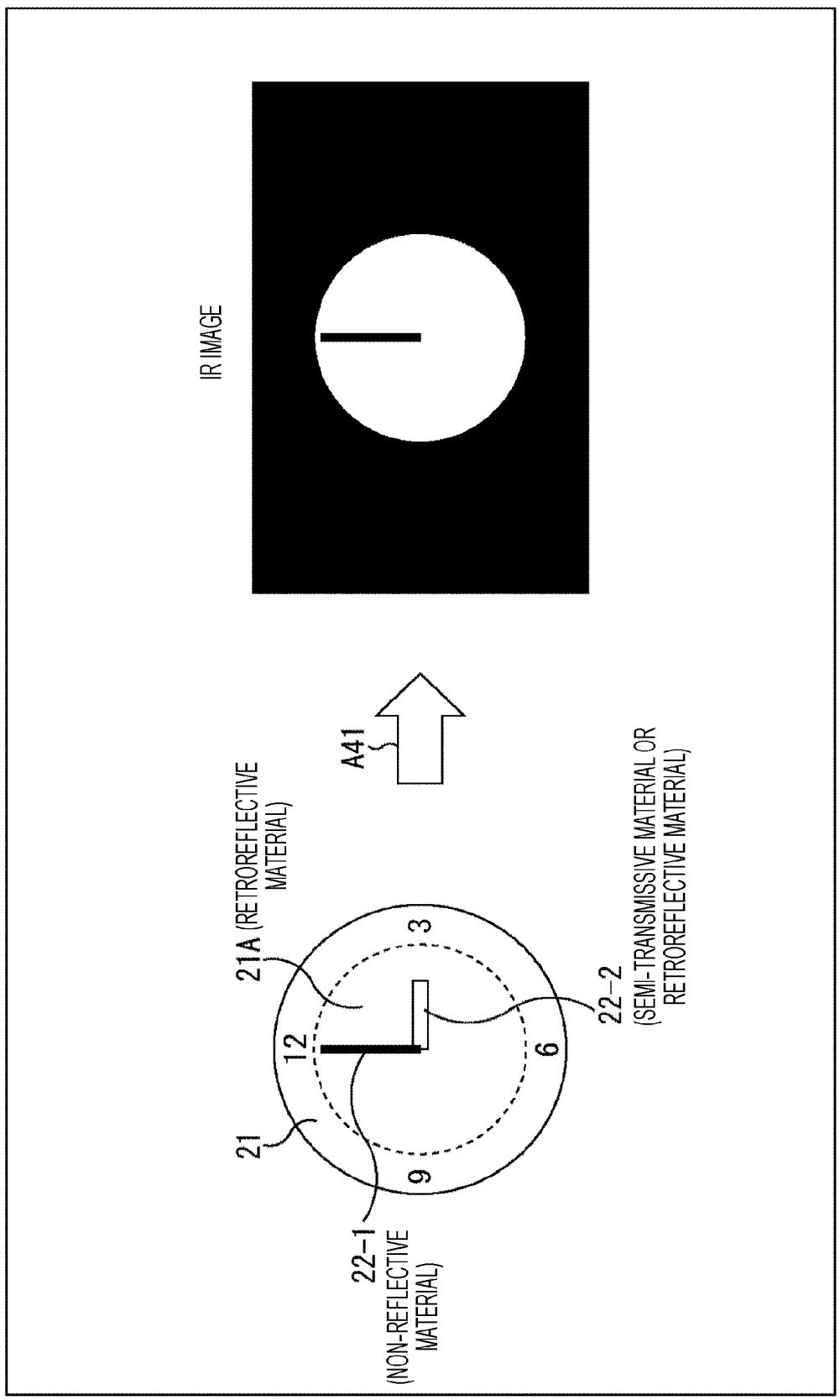
FIG. 15 is an enlarged view of a dial of the wristwatch.

FIG. 15 is an enlarged view of the dial 21 of the wristwatch 2.

The configuration of the dial 21 illustrated on the left side of FIG. 15 is different from the configuration illustrated in FIG. 11 in that the short hand 22-2 includes a semi-transmissive material or a retroreflective material.

The reflecting portion 21A including a retroreflective material for IR light is formed on the dial 21. In addition, the long hand 22-1 includes a non-reflective material for IR light.

In a case where the IR light is reflected on such a dial 21 and captured by an IR camera, an IR image as indicated by a tip of arrow A41 is acquired as a captured image.

In the IR image illustrated in FIG. 15, a portion other than the long hand 22-1 inside the reflecting portion 21A is shown in a state of having predetermined brightness. The outside of the reflecting portion 21A and the portion of the long hand 22-1 appear in a dark state.

In the information processing terminal 1, the position and posture of the dial 21 are estimated by such image processing on the IR image in which one long hand 22-1 appears together with the reflecting portion 21A. In this example, matching using the template image is not performed, and the position and posture of the dial 21 are estimated on the basis of the relationship between the shape of the reflecting portion 21A appearing in the IR image and the position of the long hand 22-1.

Figure 16:
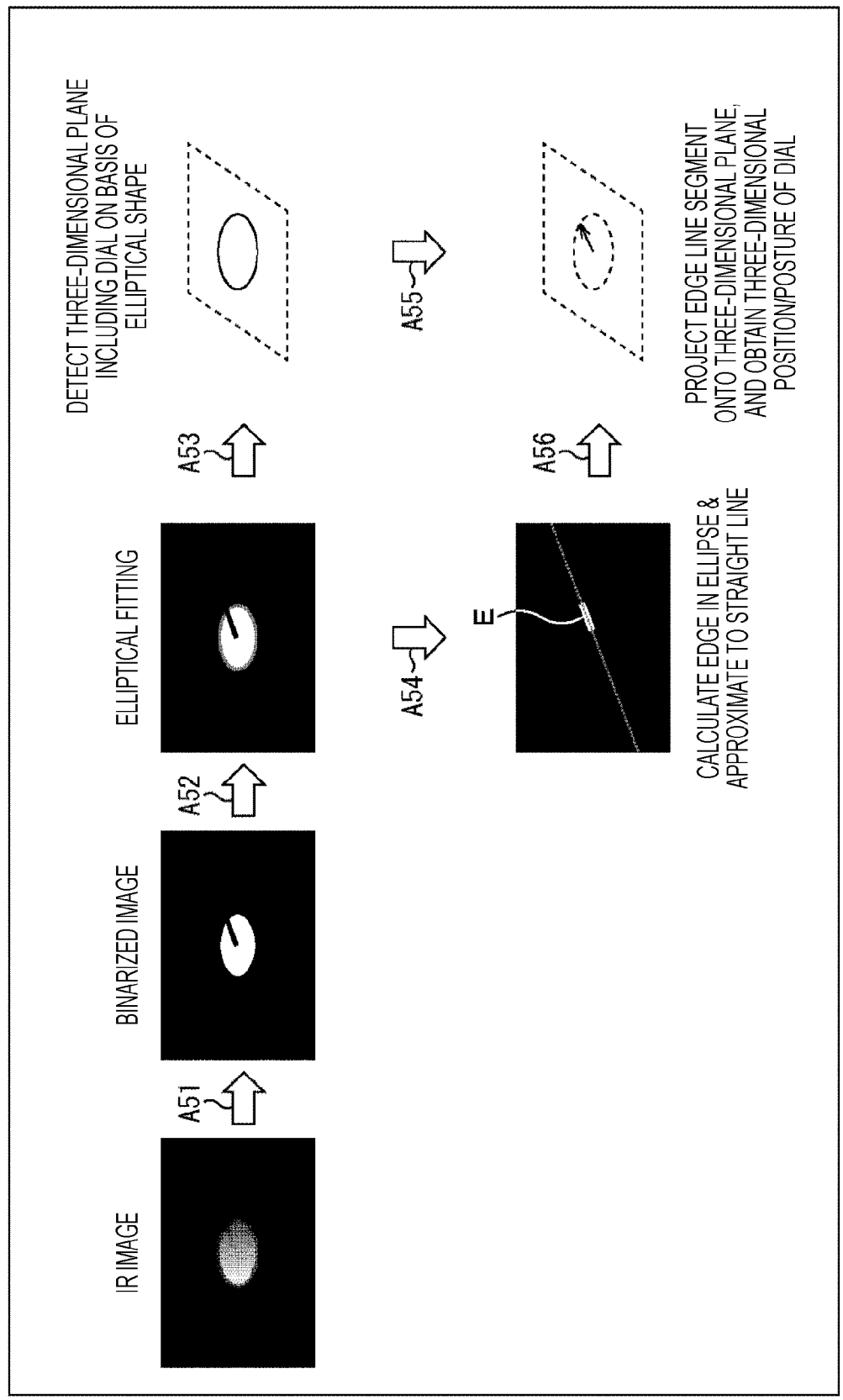
FIG. 16 is a diagram illustrating an example of image processing.

FIG. 16 is a diagram illustrating an example of image processing.

In a case where the IR image illustrated at the left end of FIG. 16 is captured, binarization processing is performed on the IR image. In the IR image to be binarized, a flat elliptical shape representing the dial 21 is shown. A straight line representing long hand 22-1 is shown on the flat elliptical shape representing dial 21.

By performing the binarization processing on the IR image, a binarized image in which an edge is emphasized as indicated by a tip of arrow A51 is generated.

As indicated at the tip of arrow A52, elliptical fitting is applied to the binarized image. The elliptical fitting is a process of aligning an ellipse having a predetermined size with an edge that is a boundary of the dial 21 appearing in the binarized image.

On the basis of the shape of the ellipse matched to the edge of the dial 21 by elliptical fitting, a plane in three-dimensional space where the dial 21 exists is detected as indicated by a dashed parallelogram at the tip of arrow A53.

On the other hand, as indicated by a tip of arrow A54, edge calculation is performed on an inner region of an ellipse matched with the edge of the dial 21 by elliptical fitting, and an edge E of a straight line representing the long hand 22-1 is detected.

As indicated by tips of arrows A55 and A56, a line segment representing the edge E is projected on a plane in a three-dimensional space where the dial 21 exists, and the position and posture of the dial 21 are estimated on the basis of the direction of the line segment representing the edge E. The direction of the line segment representing the edge E coincides with the direction of the minute of the current time. The position and posture of the dial 21 are such that long hand 22-1 indicating the minute of the current time looks like a line segment representing the edge E.

In this example, the position and posture of the dial 21 are estimated on the basis of the direction of one long hand 22-1 appearing in the IR image, but the position and posture of the dial 21 may be estimated on the basis of the direction of each of two of the long hand 22-1 and the short hand 22-2. In this case, not only the long hand 22-1 but also the short hand 22-2 includes a non-reflective material.

The long hand 22-1 may include a semi-transmissive material or a retroreflective material, and the short hand 22-2 may include a non-reflective agent.

4. Configuration of Wristwatch

In the example of FIG. 13, the IR light irradiation unit 61 as an IR light irradiation device is provided in the information processing terminal 1, but the IR light irradiation device may be provided on the wristwatch 2 side.

Figure 17A:
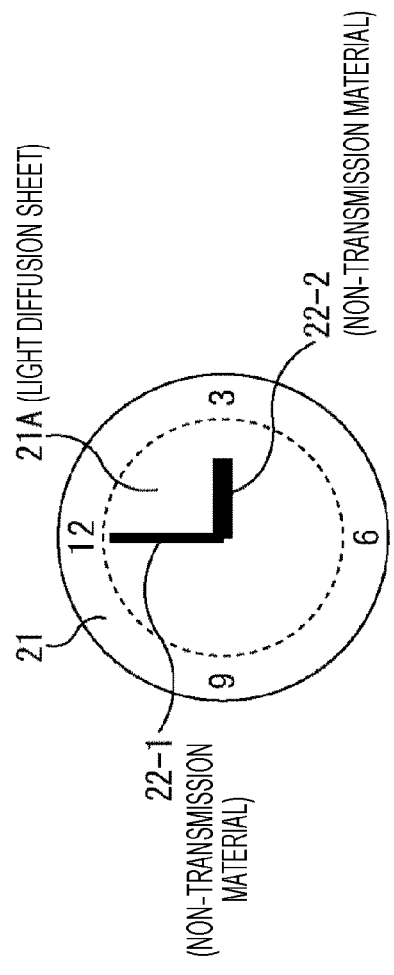
FIGS. 17A and 17B are enlarged views of a dial of the wristwatch.
Figure 17B:
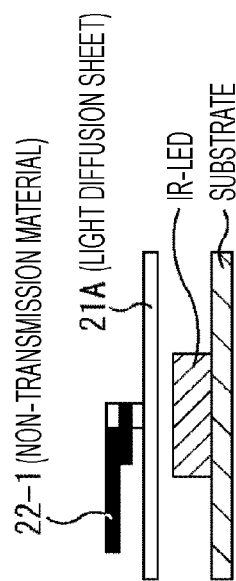

FIGS. 17A and 17B are enlarged views of the dial 21 of the wristwatch 2.

As illustrated in FIG. 17A, the reflecting portion 21A includes a light diffusion sheet. As illustrated in a cross section in FIG. 17B, an IR-LED which is an irradiation device of IR light is provided on the back side of the reflecting portion 21A. The IR light emitted from the IR-LED is diffused by the reflecting portion 21A.

By detecting the IR light diffused by the reflecting portion 21A, the IR camera 62 of the information processing terminal 1 generates the IR image as described with reference to FIG. 11, and estimates the position and posture of the dial 21 on the basis of the IR image.

In this manner, the IR light irradiation device can be provided on the wristwatch 2 side. In this case, the IR light irradiation unit 61 does not need to be provided in the information processing terminal 1.

Note that, as described with reference to FIG. 15, the short hand 22-2 of the long hand 22-1 and the short hand 22-2 may include a semi-transmissive material or a retroreflective material.

5. Other Examples

<Example of Dial Shape>

Although the shape of the dial 21 is a perfect circle, it may be a quadrangle.

In a case where the shape of the dial 21 is a quadrangle, the quadrangular template image is deformed to represent appearance when viewed from various angles, and matching is performed using the deformed template image.

For back projection from a quadrangle to a three-dimensional plane, for example, a general AR marker region detection method is used.

<Example Applied to Digital Clock>

Figure 18:
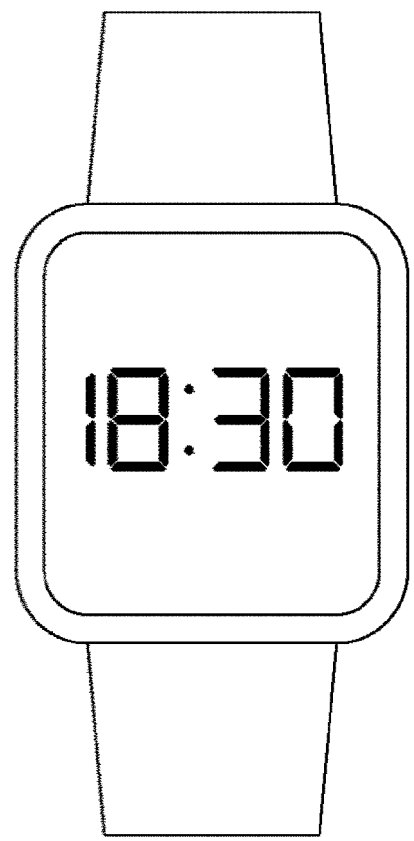
FIG. 18 is a diagram illustrating another example of the wristwatch.

FIG. 18 is a diagram illustrating another example of the wristwatch.

As illustrated in FIG. 18, a wristwatch whose time display type is a digital type can also be used as the AR controller.

In this case, instead of the clock hand 22, a template image in which a digital numerical value representing the current time is synthesized is generated, and matching is performed.

In a case where the position and posture are estimated using the IR image, a region including a retroreflective material for IR light is formed on the liquid crystal back surface. In addition, IR light may be used as light of the backlight.

<Usage Example in Case where Wristwatch is Used as AR Controller>

Since there is little resistance to wearing the wristwatch at all times, the user can widely use the wristwatch as the AR controller in daily life.

(1) The movement of a hand in a case where the user moves the hand without being conscious of the presence of the wristwatch is analyzed to support the user's behavior.

Example 1: When the user stretches his/her hand to food in a convenience store, the information processing terminal 1 displays the price, ingredients, best-before date, reviews, and the like of the food on a display.

Example 2: The information processing terminal 1 can give a warning to the user in a case where it is determined that there is an object that has not been put in the bag by photographing and storing an object that has been taken in and out of the bag by the user with the camera 52.

(2) It can be used anytime, anywhere, and immediately when intended to be used, without the trouble of mounting the device.

Example 1: In a case where the user finds that the user has no time to clean while purchasing for a visitor, the user can remotely instruct the cleaning robot where to clean while displaying a scenery in the house on the display of the information processing terminal 1.

Example 2: In a case where a message of a VR game participation request arrives from a friend in a train on commuting, the user can participate in the game by causing the information processing terminal 1 to detect a hand gesture and a touch operation on the dial 21 of the wristwatch 2.

Example 3: In a case where the user participates in a video conference using the information processing terminal 1, the user can speak while indicating a document displayed on the display of the information processing terminal 1 with a hand gesture (pointer).

Example 4: The user can photograph a scene ahead of the user's hand with the camera 52 of the information processing terminal 1.

(3) Information related to time can be confirmed on the information processing terminal 1.

Example 1: A user may confirm information such as a calendar, a schedule, a mail, an SNS, and the like.

Example 2: The user can display a past mail, an SNS message, or the like on the display of the information processing terminal 1 by turning the time adjustment dial provided on the wristwatch 2 in a predetermined direction.

Example 3: The user can display the future schedule on the display of the information processing terminal 1 by turning the time adjustment dial of the wristwatch 2 in the opposite direction.

Example 4: Instead of operating the dial, it may be possible to operate the clock face with a finger.

<Example of Information Processing Terminal>

FIGS. 19A and 19B are diagrams illustrating another example of the information processing terminal 1.

Instead of the glasses-type wearable device, an information processing terminal such as a video transmissive-type head mounted display (HMD) 1A illustrated in FIG. 19A or a portable terminal such as a smartphone 1B illustrated in FIG. 19B may be used as a display device that displays content by the AR function.

In a case where the video transmissive-type HMD 1A is used as the display device, the video of the AR content reproduced by the HMD 1A is displayed in superposition with the image of the scenery in front of the HMD 1A captured by the camera provided in the HMD 1A. In front of the field of view of the user wearing the HMD 1A, a display that displays the AR content in superposition with the image captured by the camera is provided.

Furthermore, in a case where the smartphone 1B is used, the video of the AR content reproduced by the smartphone 1B is displayed to be superimposed on the image of the scenery in front of the smartphone 1B captured by the camera provided on the back surface of the smartphone 1B.

At least one of the configurations described with reference to FIG. 5 may be realized in an external device such as a PC connected to the information processing terminal 1.

<Configuration Example of Computer>

A series of processes described above may be performed by hardware, or may be performed by software. In a case where the series of processing is executed by software, a program constituting the software is installed from a program recording medium to a computer incorporated in dedicated hardware, a general-purpose personal computer, or the like.

FIG. 20 is a block diagram illustrating a hardware configuration example of the computer which performs a series of processes described above by a program.

A central processing unit (CPU) 1001, a read only memory (ROM) 1002, and a random access memory (RAM) 1003 are mutually connected by a bus 1004.

An input/output interface 1005 is further connected to the bus 1004. An input unit 1006 including a keyboard, a mouse, and the like, and an output unit 1007 including a display, a speaker, and the like are connected to the input/output interface 1005. Furthermore, a storage unit 1008 including a hard disk, a nonvolatile memory, or the like, a communication unit 1009 including a network interface or the like, and a drive 1010 that drives a removable medium 1011 are connected to the input/output interface 1005.

In the computer configured as described above, for example, the CPU 1001 loads a program stored in the storage unit 1008 into the RAM 1003 via the input/output interface 1005 and the bus 1004 and executes the program, whereby the above-described series of processing is performed.

The program executed by the CPU 1001 is provided, for example, by being recorded in the removable medium 1011 or via a wired or wireless transmission medium such as a local area network, the Internet, or digital broadcasting, and is installed in the storage unit 1008.

Note that the program executed by the computer may be a program in which processing is performed in time series in the order described in the present specification, or may be a program in which processing is performed in parallel or at necessary timing such as when a call is made.

Further, in this specification, the system means a set of a plurality of components (devices, modules (parts), etc.) regardless of whether or not all the components are provided in the same housing. Therefore, the plurality of devices which is stored in separate housings and connected through the network, and one device in which a plurality of modules is stored in one housing may be a system.

The effects described in the present specification are merely examples and are not limited, and other effects may be provided.

Embodiments of the present technology are not limited to the above-described embodiments, and various changes can be made in a scope not departing from the spirit of the present technology.

For example, the present technology may be configured by a cloud computing system in which the plurality of devices shares one function through a network to perform the process together.

In addition, the steps described in the above flowchart may be being shared and performed by the plurality of devices instead of one device.

Further, in a case where the plurality of steps is contained in one step, the plurality of processes contained in one step may be shared and performed by the plurality of devices instead of one device.

<Combination Example of Configuration>

The present technology can also have the following configurations.

(1)

An information processing apparatus includes:
  an acquisition unit that acquires a captured image obtained by capturing an image of a wearable device including a module whose appearance changes according to time; and
  an estimation unit that detects the module appearing in the captured image on the basis of an image representing an appearance of the module according to a current time and estimates at least one of a position or a posture of the wearable device.

(2)

In the information processing apparatus according to (1), the estimation unit estimates at least one of a position or a posture of the wearable device on the basis of a result of matching in which an image representing an appearance of the module according to a current time is used as a template image.

(3)

In the information processing apparatus according to (2), the estimation unit performs matching between each part of the captured image and the template image to detect the module appearing in the captured image.

(4)

The information processing apparatus according to (2) further includes:
  a template image generation unit that generates the template image on the basis of an image of the wearable device captured in advance.

(5)

In the information processing apparatus according to (4), the wearable device is a wristwatch provided with a hand that rotates on a dial as the module, and
  the template image generation unit generates the template image by masking a region of the hand representing a capturing time of an image of the wearable device captured in advance and synthesizing an image of the hand representing a current time.

(6)

The information processing apparatus according to any one of (1) to (5) further includes:
  a camera for visible light detection that captures an image of the wearable device and generates the captured image.

(7)

In the information processing apparatus according to (6), the camera for visible light detection is a camera that captures an image used to estimate a position and a posture of the information processing apparatus worn by a user.

(8)

In the information processing apparatus according to (2), the acquisition unit acquires the captured image obtained by capturing an image of the wearable device including the module including a reflective material for infrared rays as a component using an infrared camera.

(9)

In the information processing apparatus according to (8), the wearable device is a wristwatch provided with a hand that rotates on a dial as the module, and
  at least a part of the dial includes the reflective material, and the hand includes a non-reflective material.

(10)

The information processing apparatus according to (9) further includes:
  a template image generation unit that generates the template image representing an appearance of the dial according to a current time on the basis of a shape of the dial appearing in the captured image.

(11)

In the information processing apparatus according to (10), the template image generation unit generates the template image by synthesizing an image of the hand representing a current time with an image representing a shape of the dial.

(12)

The information processing apparatus according to any one of (8) to (11) further includes:
  the infrared camera.

(13)

In the information processing apparatus according to (9), the estimation unit estimates at least one of a position or a posture of the wearable device on the basis of a relationship between a shape of the dial appearing in the captured image and a position of the hand representing a current time appearing in the captured image.

(14)

In the information processing apparatus according to any one of (1) to (4),
  the wearable device is a wristwatch provided with the module that performs digital display of time.

(15)

The information processing apparatus according to any one of (1) to (14) further includes:
  a display control unit that displays a predetermined object according to an estimation result of the estimation unit.

(16)

The information processing apparatus according to any one of (1) to (15) further includes:
  a control unit that executes predetermined processing according to a motion of a user wearing the wearable device, the motion being represented by an estimation result of the estimation unit.

(17)

An information processing method executed by an information processing apparatus includes:
  acquiring a captured image obtained by capturing an image of a wearable device including a module whose appearance changes according to time;
  detecting the module appearing in the captured image on the basis of an image representing an appearance of the module according to a current time; and
  estimating at least one of a position or a posture of the wearable device.

(18)

A program for causing a computer to execute:
  acquiring a captured image obtained by capturing an image of a wearable device including a module whose appearance changes according to time;

detecting the module appearing in the captured image on the basis of an image representing an appearance of the module according to a current time; and
estimating at least one of a position or a posture of the wearable device.

REFERENCE SIGNS LIST

1 Information processing terminal
2 Wristwatch
21 Dial
22 Clock hand
51 Controller
52 Camera
53 Sensor
54 Communication unit
55 Display unit
56 Memory
61 IR light irradiation unit
62 IR camera
71 Image acquisition unit
72 Time synchronization unit
73 Mask image generation unit
74 Template image generation unit
75 Position/posture estimation unit
76 Control unit

The invention claimed is:

1. An information processing apparatus, comprising: a camera configured to capture a first image of a wearable device, wherein the wearable device includes a module, and an appearance of the module of the wearable device changes according to time; and a central processing unit (CPU) configured to: match the captured first image and a template image, wherein the template image represents the appearance of the module according to a current time;
   detect, based on the match of the captured first image and the template image, the module of the wearable device in the captured first image; and
   estimate, based on the detected module in the captured first image, a position and a posture of the wearable device,
   wherein the estimation of the position and the posture of the wearable device is based on a shape and a position of the detected module in the captured first image and a direction of a clock-hand in the detected module, and
   wherein the direction of the clock-hand in the detected module indicates a specific current time for each instance associated with the detection of the module in the captured first image.

2. The information processing apparatus according to claim 1, wherein
   the CPU is further configured to match each part of the captured first image and the template image, and
   the each part of the captured first image and the template image are matched to detect the module in the captured first image.

3. The information processing apparatus according to claim 1, wherein
   the CPU is further configured to generate the template image based on the first image of the wearable device, and the first image is captured in advance.

4. The information processing apparatus according to claim 3, wherein
   the wearable device is a wristwatch provided with the clock-hand,
   the clock-hand rotates on a dial as the module, and the CPU is further configured to:
      mask a region of the clock-hand in the first image, the clock-hand in the first image represents a time of the capture of the second first image;
      synthesize a second image of the clock-hand with the masked region of the clock-hand of the first image, the clock-hand in the second image represents the current time; and
      generate the template image based on the synthesis, the template image represents the masked region of the clock-hand of the first image.

5. The information processing apparatus according to claim 1, wherein the camera is further configured to:
   detect visible light; and
   generate the captured first image based on the visible light detection.

6. The information processing apparatus according to claim 5, wherein
   the camera is further configured to capture a second image,
   the CPU is further configured to estimate, based on the second image, a position and a posture of the information processing apparatus, and
   the information processing apparatus is wearable by a user.

7. The information processing apparatus according to claim 1, wherein
   the module includes a reflective material for infrared rays as a component, and
   the camera is an infrared camera.

8. The information processing apparatus according to claim 7, wherein
   the wearable device is a wristwatch provided with the clock-hand,
   the clock-hand rotates on a dial as the module,
   at least a part of the dial includes the reflective material, and
   the clock-hand includes a non-reflective material.

9. The information processing apparatus according to claim 8, wherein
   the CPU is further configured to generate the template image based on a shape of the dial in the captured first image, and
   the template image represents the appearance of the dial according to the current time.

10. The information processing apparatus according to claim 9, wherein the CPU is further configured to:
    synthesize a second image of the clock-hand that represents the current time with the captured first image that represents the shape of the dial; and
    generate the template image based on the synthesis.

11. The information processing apparatus according to claim 8,
    wherein the CPU is further configured to estimate the at least one of the position or the posture of the wearable device based on a relationship between a shape of the dial in the captured first image and a position of the clock-hand that represents the current time in the captured first image.

12. The information processing apparatus according to claim 1, wherein
    the wearable device is a wristwatch provided with the module, and
    the wristwatch performs digital display of time.

13. The information processing apparatus according to claim 1, wherein the CPU is further configured to control display of an object based on the estimation.

14. The information processing apparatus according to claim 1, wherein
the CPU is further configured to execute specific processing based on a motion of a user wearing the wearable device, and
the motion is represented based on the estimation.

15. An information processing method executed by an information processing apparatus, the information processing method comprising:
capturing an image of a wearable device, wherein the wearable device includes a module, and an appearance of the module of the wearable device changes according to time;
matching the captured image and a template image, wherein the template image represents the appearance of the module according to a current time;
detecting, based on the match of the captured image and the template image, the module of the wearable device in the captured image; and
estimating, based on the detected module in the captured image, a position and a posture of the wearable device,
wherein the estimating of the position and the posture of the wearable device is based on a shape and a position of the detected module in the captured image and a direction of a clock-hand in the detected module,
and wherein the direction of the clock-hand in the detected module indicates a specific current time for each instance associated with the detection of the module in the captured image.

16. A non-transitory computer readable medium having stored thereon, computer executable instructions, which when executed by a computer, cause the computer to execute operations, the operations comprising:
capturing an image of a wearable device, wherein the wearable device includes a module, and an appearance of the module of the wearable device changes according to time;
matching the captured image and a template image, wherein the template image represents the appearance of the module according to a current time;
detecting, based on the match of the captured image and the template image, the module of the wearable device in the captured image; and
estimating, based on the detected module in the captured image, a position and a posture of the wearable device,
wherein the estimating of the position and the posture of the wearable device is based on a shape and a position of the detected module in the captured image and a direction of a clock-hand in the detected module,
and wherein the direction of the clock-hand in the detected module indicates a specific current time for each instance associated with the detection of the module in the captured image.

* * * * *